(12) United States Patent  
Gillespie

(10) Patent No.: US 7,625,128 B2
(45) Date of Patent: Dec. 1, 2009

(54) THRUST BEARING HOUSING FOR A GAS TURBINE ENGINE

(75) Inventor: Christopher Gillespie, Auckland (NZ)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 489 days.

(21) Appl. No.: 11/530,098

(22) Filed: Sep. 8, 2006

(65) Prior Publication Data

US 2008/0063334 A1 Mar. 13, 2008

(51) Int. Cl.
*F16C 27/04* (2006.01)
*F01D 25/16* (2006.01)
*F03B 11/06* (2006.01)

(52) U.S. Cl. .................. 384/535; 384/581; 415/142; 415/170.1

(58) Field of Classification Search ............... 384/535, 384/581, 99; 415/9, 110, 142, 170.1
See application file for complete search history.

(56) References Cited

U.S. PATENT DOCUMENTS

| 4,084,861 | A | 4/1978 | Greenberg et al. |
| 4,306,755 | A | 12/1981 | Roberts |
| 4,322,117 | A | 3/1982 | Briggs |
| 4,375,906 | A | 3/1983 | Roberts et al. |
| 4,578,018 | A | 3/1986 | Pope |
| 4,730,977 | A | 3/1988 | Haaser |
| 5,433,584 | A | 7/1995 | Amin et al. |
| 5,791,789 | A | 8/1998 | Van Duyn et al. |
| 6,082,959 | A | 7/2000 | Van Duyn |
| 6,331,078 | B1 | 12/2001 | Van Duyn |
| 6,439,772 | B1 | 8/2002 | Ommundson et al. |
| 6,491,497 | B1 | 12/2002 | Allmon et al. |
| 6,783,319 | B2 | 8/2004 | Doerflein et al. |
| 6,799,416 | B2 | 10/2004 | Plona et al. |
| 7,011,490 | B2 | 3/2006 | Albrecht et al. |
| 7,097,413 | B2 | 8/2006 | VanDuyn |
| 2005/0129343 | A1* | 6/2005 | Bouchy et al. ............... 384/535 |
| 2006/0117756 | A1 | 6/2006 | Wakeman et al. |
| 2006/0120854 | A1 | 6/2006 | Wakeman et al. |

FOREIGN PATENT DOCUMENTS

JP 56006640 A * 1/1981

* cited by examiner

*Primary Examiner*—Thomas R Hannon
(74) *Attorney, Agent, or Firm*—Bachman & LaPointe, P.C.

(57) ABSTRACT

The thrust bearing housing comprises two opposite annular end members and a cone member extending between the two end members. The cone member is connected to each end member at a circular junction, each circular junction having a medial line which borders a respective end of a virtual conical plane. At least a major portion of the cone member is provided inside the virtual conical plane.

4 Claims, 3 Drawing Sheets

THRUST BEARING HOUSING FOR A GAS TURBINE ENGINE

TECHNICAL FIELD

The present invention is concerned with the design of a thrust bearing housing, for a gas turbine engine and more particularly to a thrust bearing housing capable of supporting higher loads that may be experienced during a fan blade off (FBO) or a foreign object damage (FOD).

BACKGROUND

The fan rotor of a gas turbine engine can have a severe radial unbalance in case of the loss of a fan blade or if a significant blade deformation occurs due to an impact with a foreign object, such as a large bird. This radial unbalance will be in addition to the usual axial and radial loads generated by the fan. The thrust bearing housing must be able to sustain the full load in the event that the front bearing, if any, is compromised and that the low pressure (LP) shaft is severed. A front bearing is provided in some gas turbine engines to support the front of the LP spool. However, a front bearing is usually designed to be frangible in order to protect the major structures from excessive loading during an FBO and FOD event. Since the fan rotor generally overhangs forward of the thrust bearing, the thrust bearing can be cross-cornered during an FBO or FOD event, thereby generating a massive moment load on the thrust bearing housing that supports the outer race of the thrust bearing.

FIG. 3 shows an example of a thrust bearing housing 20' as found in the prior art. With the prior design, the thrust bearing housing 20' had no significant hinge point, and the moment loading buckles at the cone at the low diameter. Any hinging occurs on the same side of the flange that the bearing resides. Analytical results from FBO and FOD simulations show that the housing damage is focus low in the cone and plastic strain could exceed the material limits.

Overall, although existing designs of the thrust bearing housing were generally satisfactory, it was still desirable to provide an improved thrust bearing housing having an increased capability of supporting an FBO or FOD event.

SUMMARY

In one aspect, the present invention provides a thrust bearing housing for a gas turbine engine, the thrust bearing housing comprising two opposite annular end members and a cone member extending between the two end members, the cone member being connected to each end member at a circular junction, each circular junction having a medial line which borders a respective end of a virtual conical plane, at least a major portion of the cone member being provided inside the virtual conical plane.

In another aspect, the present concept provides a thrust bearing housing for a gas turbine engine, the thrust bearing housing including a conical portion and a radial portion, the conical portion including a bearing flange and the radial portion including a housing flange, the portions meeting at a hinge point, the hinge point located axially forward of the bearing flange, the hinge point being radially closer to the housing flange than the bearing flange.

Further details of these and other aspects of the improved thrust bearing housing will be apparent from the detailed description and figures included below.

BRIEF DESCRIPTION OF THE FIGURES

For a better understanding and to show more clearly how it may be carried into effect, reference will now be made by way of example to the accompanying figures, in which.

DETAILED DESCRIPTION

Figure 1:
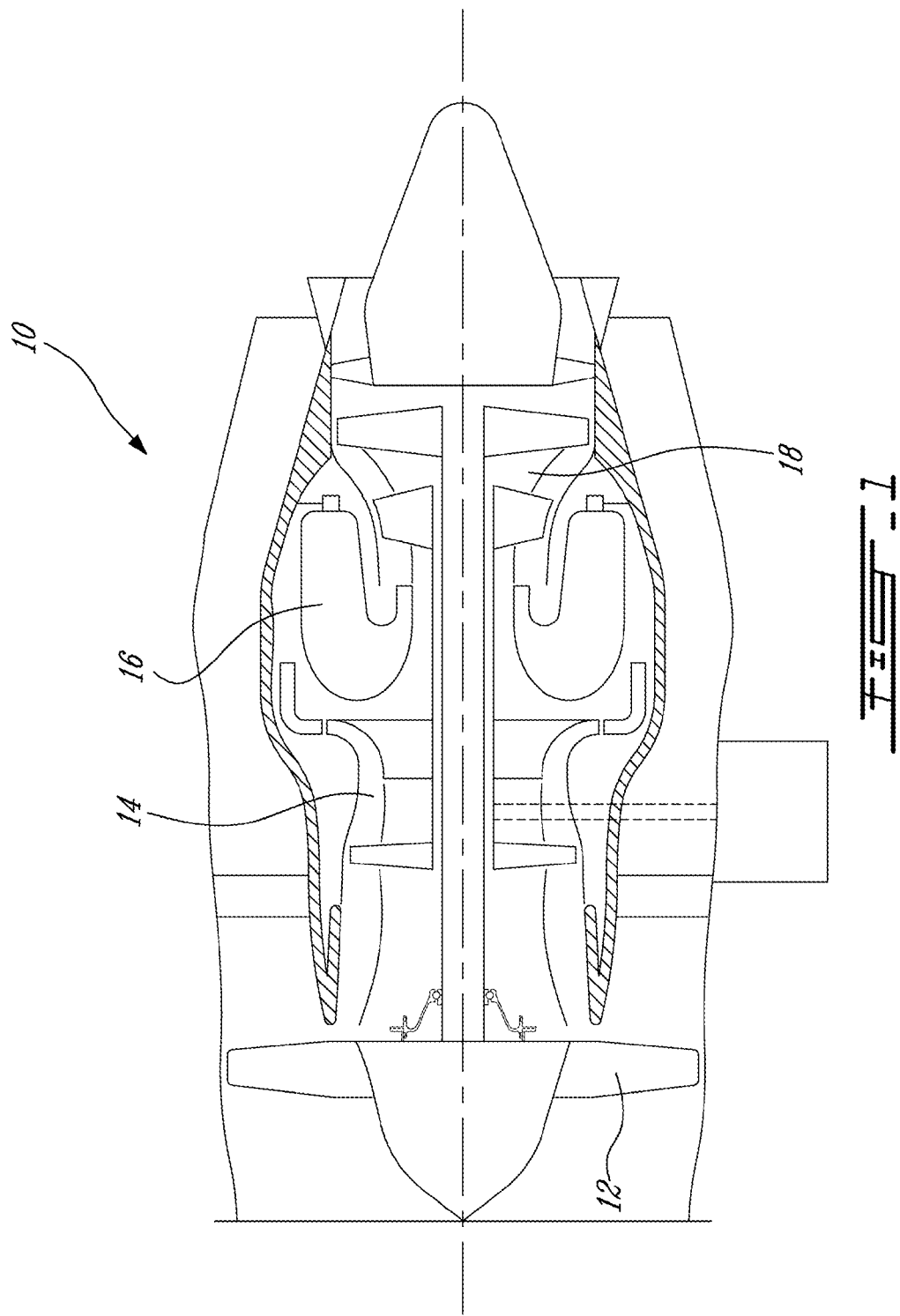
FIG. 1 schematically shows a generic gas turbine engine to illustrate an example of a general environment in which the improved thrust bearing housing can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. FIG. 1 only shows one example of the general environment in which the improved thrust bearing housing can be used. The improved thrust bearing housing can be used with other turbofan models or other kinds of gas turbine engines, such as turboprop engines. An example of the thrust bearing housing 20 and its associated thrust bearing 22 are schematically shown in FIG. 1. The thrust bearing housing 20 is positioned in the front section of the LP spool. It supports the LP shaft 24, with all the various elements mounted thereon, through the thrust bearing 22.

Figure 2:
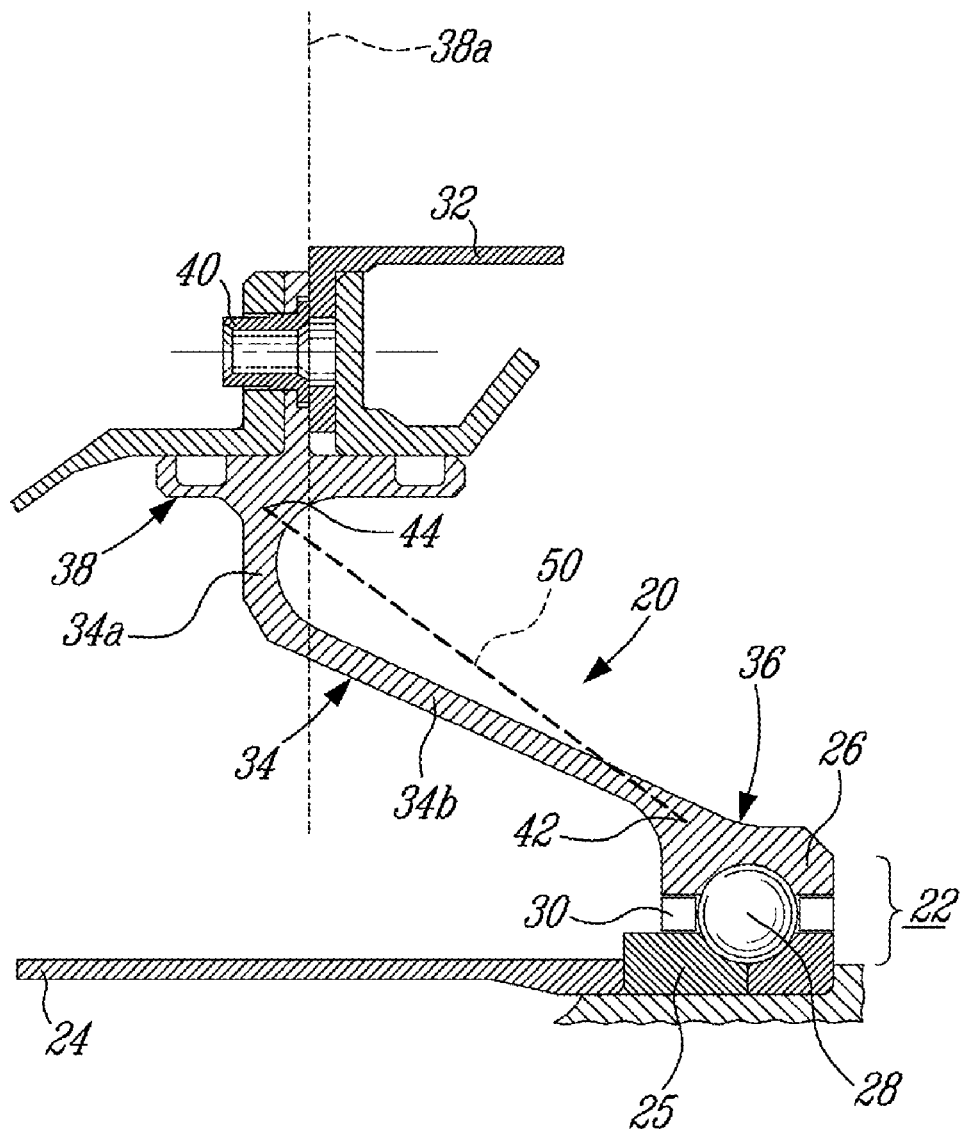
FIG. 2 is a partial cross-sectional view showing an example of an improved thrust bearing housing and a thrust bearing.
Figure 3:
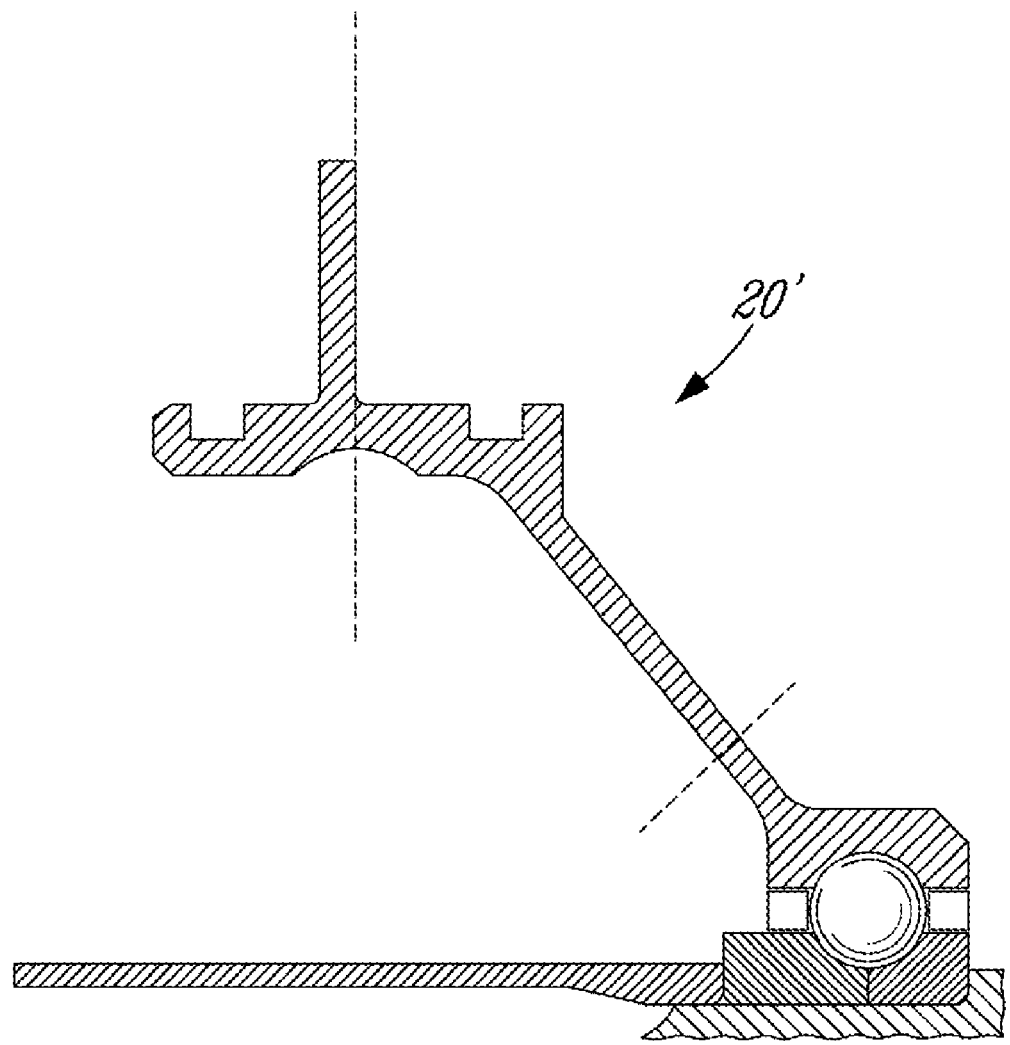
FIG. 3 is a partial cross-sectional view showing an example of a thrust bearing housing as found in the prior art.

FIG. 2 illustrates in a more detailed manner the improved thrust bearing housing 20. The thrust bearing 22 comprises an inner race 25 and an outer race 26 between which rolling elements 28 are provided, such as balls. The rolling elements 28 are separated from each other by a cage 30. Because of the magnitude of the rotation speed and of the loads applied on the thrust bearing 22, the bearing is lubricated using a pressurized oil supply. The pressurized oil supply system has been omitted from FIG. 2 for the sake of clarity.

The outer race 26 of the thrust bearing 22 is connected to the inner end of the thrust bearing housing 20. The outer end of the thrust bearing housing 20 is rigidly connected to a solid part 32 of the gas turbine engine.

The thrust bearing housing 20 comprises a cone member 34 extending between two opposite annular end members 36, 38. In FIG. 2, the inner annular end member 36 includes the outer race 26 of the thrust bearing 22. The outer end member 38 is the one which is connected to the solid part 32 of the gas turbine engine, for instance using fasteners 40.

The cone member 34 of the thrust bearing housing 20 is connected to each annular end member 36, 38, which connection defines a circular junction, identified as with reference numerals 42 and 44 in FIG. 2. Each circular junction 42, 44 has a medial line which approximately corresponds to the geometric center of the junctions 42, 44 between the two members.

In the improved thrust bearing housing 20, the medial line of each circular junction 42, 44 borders a respective end of a virtual conical plane 50. This virtual conical plane 50 is shown in FIG. 2 in stippled lines. As can be appreciated, at least the major portion of the cone member 34 is provided inside the virtual conical plane 50. This provides many advantages. One of them is that the major hinge point of the thrust bearing housing 20 is located at a higher diameter and is more axially distant (in this embodiment in a forward direction) from the point of load application (i.e. the bearing) compared to a cone member 34 that is simply straight. In case of an FBO or FOD event, the thrust bearing housing 20 will then have an increased ability to handle a moment load (rotation and flexibility) applied at the thrust bearing 22.

As aforesaid, the major hinge point will be located at a higher diameter, meaning that the hinge point is located radially closer to the flange 38 than to bearing location, which results in a higher sectional inertia. Higher sectional inertia tends to translate into lower material stresses. The major hinge point is also preferably offset relative to the flange 38, and preferably located towards the side of the flange 38 that is opposite to the side that the thrust bearing 22 resides, as is shown in FIG. 2. The flange 38 is divided in two halves by a center line 38a. The cone member 34 is connected to the flange 38 at the half that is axially away from the thrust bearing 22.

Preferably, the cone member 34 has more than one segment. For instance, as illustrated in FIG. 2 the cone member 34 can be provided with a substantially radially projecting outer segment 34a and the remaining segment 34b of the cone member 34 has a shallower angle.

The above description is meant to be exemplary only, and one skilled in the art will recognize that other changes may also be made to the embodiments described without departing from the scope of the invention disclosed as defined by the appended claims. For instance, the exact shape of the thrust bearing housing can be different from what is shown in FIG. 2. The thrust bearing housing can be connected to a solid part of the gas turbine engine using a securing method that does not involve fasteners. The bearing for use with the thrust bearing housing can be different from what is shown in FIG. 2. Still other modifications which fall within the scope of the present invention will be apparent to those skilled in the art, in light of a review of this disclosure, and such modifications are intended to fall within the appended claims.

What is claimed is:

1. A thrust bearing housing for a gas turbine engine, the thrust bearing housing comprising two opposite annular end members and a cone member extending between the two end members, the cone member being connected to each end member at a circular junction, each circular junction having a medial line which borders a respective end of a virtual conical surface, at least a major portion of the cone member being provided inside the virtual conical surface, the cone member comprising a substantially radially projecting outer segment, and a conical portion connected to the radially projecting outer segment and positioned entirely downstream of the radially projecting outer segment.

2. A thrust bearing housing for a gas turbine engine, the thrust bearing housing including a conical portion and a radial portion, the conical portion including a bearing flange and the radial portion including a housing flange, with the housing flange and the bearing flange being axially offset, the portions meeting at a hinge point, the hinge point located axially forward of the bearing flange, the hinge point being radially closer to the housing flange than the bearing flange, the housing flange having two halves, the first half being axially closer to the bearing flange than the second half, the radial portion joining the housing flange at the second half.

3. The thrust bearing housing as defined in claim 2 wherein the radial portion joins the housing flange generally perpendicularly.

4. The thrust bearing housing as defined in claim 2, wherein the radial portion joins the housing flange asymmetrically relative to a radial center plane of the housing flange.

* * * * *